F. F. BURTON.
TELESCOPE SIGHT FOR FIREARMS.
APPLICATION FILED JULY 31, 1918.

1,293,325.

Patented Feb. 4, 1919.

Inventor
Frank F. Burton
by Seymour Earle
atty

UNITED STATES PATENT OFFICE.

FRANK F. BURTON, OF EAST HAVEN, CONNECTICUT, ASSIGNOR TO WINCHESTER REPEATING ARMS CO., OF NEW HAVEN, CONNECTICUT, A CORPORATION.

TELESCOPE-SIGHT FOR FIREARMS.

1,293,325.  Specification of Letters Patent.  Patented Feb. 4, 1919.

Application filed July 31, 1918. Serial No. 247,616.

*To all whom it may concern:*

Be it known that I, FRANK F. BURTON, a citizen of the United States, residing at East Haven, in the county of New Haven and State of Connecticut, have invented a new and useful Improvement in Telescope-Sights for Firearms; and I do hereby declare the following, when taken in connection with the accompanying drawings and the characters of reference marked thereon, to be a full, clear, and exact description of the same, and which said drawings constitute part of this application, and represent, in—

Figure 1:
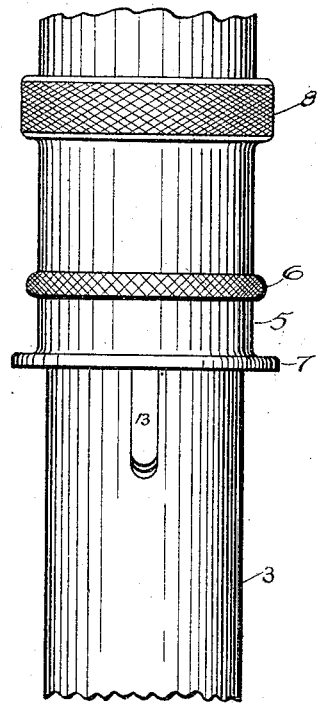

Figure 1 a broken plan view of the ocular end of a telescope sight embodying my invention.

Figure 2:
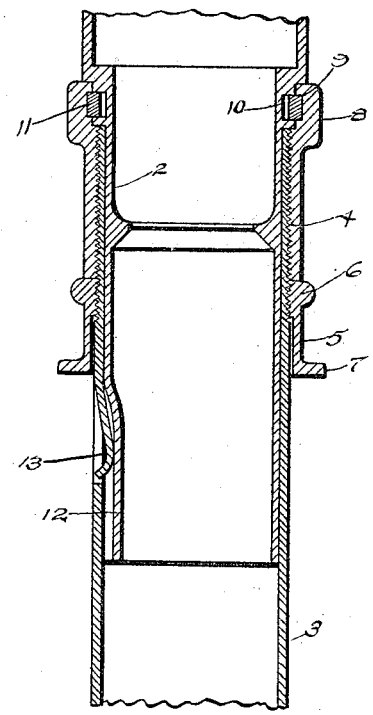

Fig. 2 a view thereof in central longitudinal section.

Figure 3:
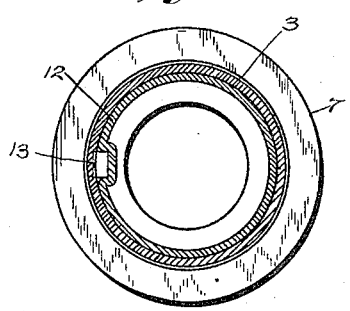

Fig. 3 an end view looking rearward toward the locking-ring.

Figure 4:
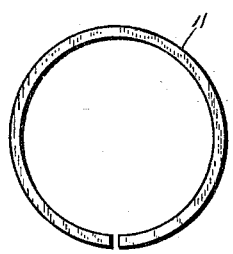

Fig. 4 a detached plan view of the coupling-ring.

Figure 5:
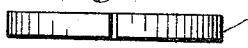

Fig. 5 an edge view thereof.

My invention relates to an improved telescope sight for firearms, the object being to provide simple, convenient and reliable means for focusing the ocular-lens without rotating the same.

With these ends in view, my invention consists in a telescope sight for firearms, having certain details of construction as will be hereinafter described and pointed out in the claims.

In carrying out my invention, I employ an ocular lens-cell 2 which is located within the rear end of the main telescope tube 3 so as to be longitudinally slidable therein. The rear end of the said tube is externally threaded for the application to it of an internally threaded adjusting-sleeve 4 and an internally threaded locking-ring 5 therefor, the said ring being formed at its rear end with a knurled bead 6 and at its forward end with a flange 7 to serve as a stop to limit the forward movement of the tube, by contact with the rear mount. At its rear end the sleeve is enlarged to form a wide, flat knurled bead 8 having an internal annular channel 9 located directly opposite a corresponding channel 10 in the rear portion of the cell 2, the said channels receiving the opposite edges of a split coupling-ring or annular key 11 which couples the sleeve 4 and cell 2 so that when the former is turned, the cell is moved forward or back, as the case may be, without rotating it. The frictional rotation of the cell is prevented by striking its forward end inward to form a longitudinal groove 12 which receives a tongue 13 struck inward from the tube 3.

In order to focus the ocular system of the telescope, the locking-ring 5 is turned forward to release the adjusting-sleeve 4 which is thus left free to be turned to slide the ocular-cell 2 forward or back, as may be required, after which the locking-ring 5 is turned so as to again impinge its rear end upon the forward end of the sleeve 4 and lock the same against rotation in either direction.

I claim:—

1. In a telescope sight for firearms, the combination with a telescope tube having its rear end externally threaded, of a longitudinally slidable ocular lens-cell located within the tube and formed with a circumferential channel, of an internally threaded adjusting screw mounted upon the threaded rear end of the tube and formed with an internally arranged complementary channel, and a coupling ring or annular key located in the said channels for coupling the said lens-cell and adjusting sleeve together, whereby the cell may be moved longitudinally without rotating it.

2. In a telescope sight for firearms, the combination with a telescope tube having its rear end exteriorly threaded, of a longitudinally slidable ocular lens-cell located within the tube, an internally threaded adjusting-sleeve mounted upon the threaded rear end of the tube, a locking-ring also mounted upon the rear end of the tube in position to engage with the said sleeve, and a coupling-ring interposed between the rear end of the sleeve and the cell for coupling them together, whereby the cell may be moved longitudinally without rotating it.

3. In a telescope sight for firearms, the combination with a telescope tube having its rear end exteriorly threaded, of a longitudinally slidable ocular lens cell located within the tube, an internally threaded adjusting-sleeve mounted upon the threaded rear end of the tube, a locking-ring also mounted upon the rear end of the tube in position to engage with the said sleeve, and a coupling-ring interposed between the rear end of the sleeve and the cell for coupling them together, whereby the sleeve may be rotated without rotating the cell, and means for holding the ocular lens-cell against rotation in the tube.

4. In a telescope sight for firearms, the combination with a telescope tube having its rear end exteriorly threaded, of a longitudinally slidable ocular lens-cell located within the tube, an internally threaded adjusting-sleeve mounted upon the threaded rear end of the tube, a locking-ring also mounted upon the rear end of the tube in position to engage with the said sleeve, and a coupling-ring interposed between the rear end of the sleeve and the cell for coupling them together, whereby the sleeve may be rotated without rotating the cell, a groove in the forward end of the cell, and a tongue extending inward from the tube into the said groove for holding the cell against rotation.

In testimony whereof I have signed this specification in the presence of two subscribing witnesses.

FRANK F. BURTON.

Witnesses:
THOMAS C. JOHNSON,
ERIK S. PALMER.

Copies of this patent may be obtained for five cents each, by addressing the "Commissioner of Patents, Washington, D. C."